United States Patent [19]

Sokolow

[11] 3,947,243

[45] Mar. 30, 1976

[54] OVEN WITH PARISON ROTATING MEANS

[75] Inventor: Nickolas N. Sokolow, Cheshire, Mass.

[73] Assignee: Beloit Corporation, Beloit, Wis.

[22] Filed: Dec. 30, 1974

[21] Appl. No.: 537,280

[52] U.S. Cl. .................... 432/124; 65/268; 74/411; 74/461
[51] Int. Cl.² .......................................... F27B 9/14
[58] Field of Search .............. 432/124; 74/411, 461; 65/227, 268

[56] References Cited
UNITED STATES PATENTS

| | | | |
|---|---|---|---|
| 2,469,681 | 5/1949 | Coby | 74/761 X |
| 2,539,135 | 1/1951 | Hess | 432/124 |
| 3,740,868 | 6/1973 | Moore et al. | 432/124 |

Primary Examiner—John J. Camby
Attorney, Agent, or Firm—Dirk J. Veneman; Bruce L. Samlan; Gerald B. Mathews

[57] ABSTRACT

An oven for heating tubular parisons has a conveyor passing therethrough with parison holders rotatably mounted thereon for vertically supporting the parisons. To assure uniform heating of the parisons around their circumferences, the parison holders are rotated about their axes. For this purpose teeth projecting out from the parison holders engage a group of stiff brush-like bristles, arranged either as tufts or as a continuous stand thereof, fixedly arranged alongside the conveyor path at a distance therefrom to be engaged by the said teeth.

17 Claims, 12 Drawing Figures

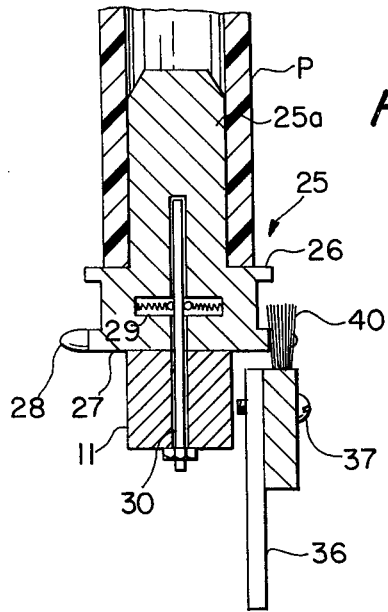
FIG. 3
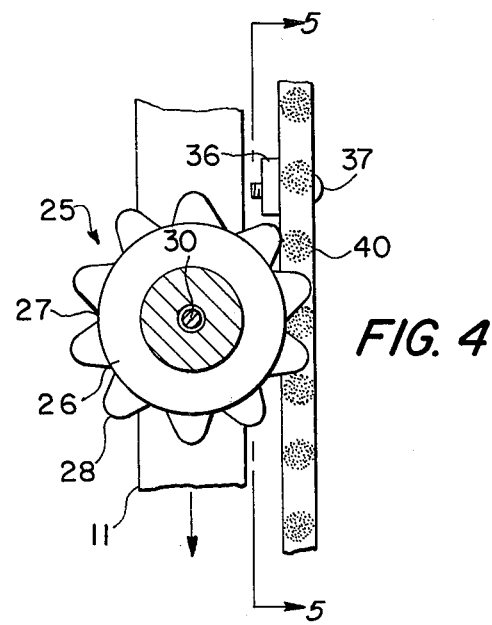
FIG. 4
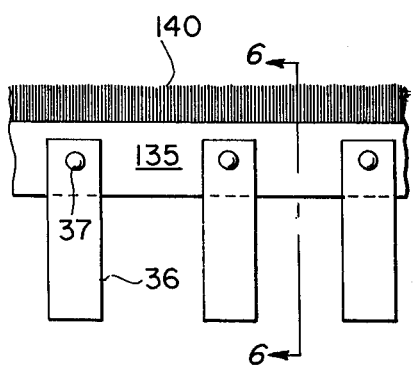
FIG. 5
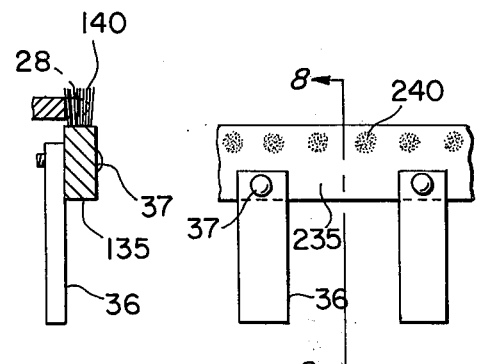
FIG. 7
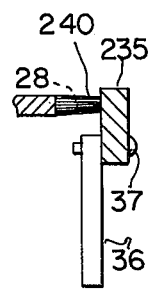
FIG. 8
FIG. 6
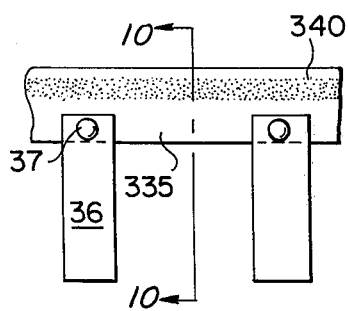
FIG. 9
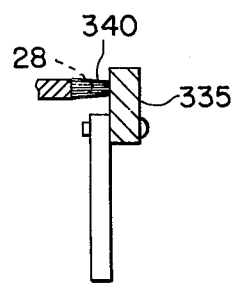
FIG. 10
FIG. 11   FIG. 12

OVEN WITH PARISON ROTATING MEANS

BACKGROUND OF THE INVENTION

This invention relates to ovens for preheating of tubular parisons or the like in preparation for a blow molding operation, and in particular it relates to means for improving the uniform application of the heat to the parisons.

In recent years, there has developed techniques whereby blow molded articles can be produced having biaxial orientation, which articles have exceptional strength and highly desirable physical properties such as clarity. This technique involves forming a tubular parison, cooling it to well below its melting point and thereafter heating it to its orientation temperature. The orientation temperature is just below the crystalline melt point in the case of crystalline materials and 40° to 225° F below the homogenous melt point for amorphous materials. Since the parison is cooled between its formation and its use, this technique provides the significant advantage that these two functions, i.e., forming the parison and forming the finished article from the parison may be separated in time and/or place so that the formed parison can for example be sold to others who may have facilities for forming finished articles from the parisons but who may not have the facilities for function forming the parisons. Since the functin of forming the finished articles then commences with a cold parison, this technique has become known as the cold parison technique. An apparatus for heating cold parisons to an appropriate forming temperature, and transferring the heated parisons to a blow mold and then stretching the parison and blow molding it into the form of a finished article is shown and described in considerable detail in commonly owned U.S. Pat. No. 3,765,813.

The oven is of critical importance in this overall apparatus. It represents a major portion of the overall cost of the apparatus so that ideally the parisons should be brought to the forming temperature, i.e., the orientation temperature therein as rapidly as possible. On the other hand, however, the qualitative demands of the oven are considerable in that the parisons must not only be heated to a fairly precise temperature but also they must be heated uniformly along their lengths, about their circumferences and through their wall thicknesses; and if these demands are not met, resulting in an improperly heated parison, the result will be a rejected defective article which of course represents an economic waste of machine time, not to mention the costs involved in regrinding the plastic material for further use.

The problem of heating the parisons uniformly within the oven has been attacked heretofore. Commonly owned U.S. Pat. No. 3,801,263 shows and describes a new and improved parison heating oven wherein the heated air enters at one side of the oven and flows thereacross to an exhaust plenum on the opposite side thereof. This patent also describes the concept of providing means for specifically varying the heat as applied to different axial portions of the parisons for the purpose of "programming" an intentional non-uniform temperature along the length of the parison so that in the subsequent stretching and blow molding steps certain portions of the finished article will intentionally be of a greater thickness than other portions so as to provide for example an article having a greater wall thickness at the bottom. However, even in this case the problem still exists of assuring that the heat is applied uniformly about the circumference of the parison.

One solution to the problem of heating a parison uniformly about its circumference has been to rotate the parison about its axis as it moves through the oven. This known technique normally involves mounting the parison on a rotatable member which includes a toothed wheel and providing some type of fixed means alongside the conveyor path which cooperates with this toothed wheel. One such arrangement is shown in commonly owned U.S. Pat. No. 3,740,868 wherein the toothed "starwheel" engages pins placed alongside the conveyor path. Another arrangement is shown in the Marzillier U.S. Pat. No. 3,149,373 wherein a chain is provided alongside the conveyor path and the toothed wheel is actually a sprocket which engages the openings in the chain. However, these previous arrangements for rotating the parisons about their axes have had considerable disadvantages. In either case the tooth engaging means have been stiff essentially unyielding members thereby requiring a high degree of precision both in the construction and the mounting within the oven of the tooth engaging means. Moreover, even with the highest degree or precision there would be times such as during initial engagement of the toothed wheels with their respective tooth engaging means wherein the teeth would not necessarily be perfectly aligned with the engaging means so that initially a tooth might abruptly bump rather than move neatly between the fixed vertical pieces of the engaging means. At the least this might result in a continued improper engagement between the toothed wheel and the engaging means resulting in the parison not being heated uniformly about its circumference and hence ultimately becoming a reject. At worst, however, this abrupt abutment could result in breakage to the relatively expensive toothed wheel rotating member. While this problem exists with respect to both types of tooth engaging means, it is perhaps more severe in the case of the chain type engaging means since in that case the openings for the teeth are defined not only by vertically extending elements but also by upper and lower horizontally extending elements so that precision alignment is required both horizontally and vertically.

Thus, there exists a need for a new and improved tooth engaging means for cooperating with a toothed wheel which overcomes the problems present in the prior art.

SUMMARY OF THE INVENTION

Thus, it is a purpose of the present invention to provide a new and improved oven for uniformly heating parisons in a manner which will overcome the disadvantages of previously known arrangements.

This purpose of the present invention is achieved by providing, in a parison heating oven of the type having a conveyor carrying therethrough a plurality of rotatable parison holders, a new and improved means positioned alongside at least certain portions of the conveyor for engaging the toothed wheels of the parison holders for turning these wheels about their axes as the parison holders move through the oven. In accordance with a main feature of the present invention, this tooth engaging means combines the characteristic of sufficient stiffness to accomplish turning of the parison holders with the capability of yielding to forces exerted thereon by misalignment between the teeth of the toothed wheel and the tooth engaging means so that misalignment can rapidly and easily work itself out without damage to either the tooth engaging means or the teeth of the toothed wheel. This is accomplished by constructing the tooth engaging means in the form of groups of stiff bristles. In a preferred arrangment the bristles are in the form of individual tufts which preferably extend vertically and are spaced apart by a distance related to the pitch of the teeth on the toothed wheel so that the individual teeth would essentially move between the individual tufts. If a misaligned tooth then directly abuts one of these tufts so as to push directly thereinto, the individual bristles, being flexible, would yield or separate, thus allowing the tooth to penetrate into that tuft. Even in this case there is a reaction against the tooth in the direction of travel of the conveyor so that the parison holder will still continue to rotate without interruption. Usually within less than one full turn the toothed wheel will position itself in proper relation with its teeth entering directly between the tufts. From then on the toothed wheel will rotate in perfect mesh with the tufts, and therefore it is often satisfactory to utilize the bristle tooth engaging means of the present invention as the initial portion of a tooth engaging stage, followed by the prior art type of tooth engaging means such as the chain type immediately downstream therefrom.

The advantages of the present invention are also achieved with bristle arrangements which are modified as compared with the above described vertically oriented tufts. For example, the tufts can also be arranged to extend horizontally toward the conveyor path with the teeth entering the spaces between the free ends of the tufts. Alternatively, in place of tufts, the tooth engaging means may comprise a continuous run of bristles such as a continuous stand of closely spaced bristles, arranged either vertically or horizontally, or a row of bristles held by a twisted wire such as on a bottle cleaning brush, whereupon the teeth would simply push into the mass of bristles and roll therealong.

Thus, it is a purpose of the present invention to provide a new and improved parison heating oven having a new and improved means for causing uniform application of the oven heat to the parisons.

It is another object of the present invention to provide, in a parison heating oven of the type having a conveyor movable through an oven and having mounted thereon rotatable toothed parison holders (hereinafter referred to as an oven of the type described), a new and improved means for engaging and rotating the teeth of the rotatable member which minimizes both the requirements for precision and the occurrences of misalignment between the elements.

It is another object of the present invention to provide, in an oven of the type described, a new and improved tooth engaging means combining the characteristics of sufficient stiffness to rotate the teeth with the capability of yielding so as to avoid damage and correct misalignment.

It is still another object of the invention to provide, in an oven of the type described, a new and improved tooth engaging means comprising stiff bristles either in the form of spaced apart tufts of bristles or as a continuous run of such bristles.

These and other objects of the present invention will become apparent from the detailed description to follow taken together with the accompanying drawings.

BRIEF DESCRIPTION OF THE DRAWINGS

There follows a detailed description of preferred embodiments of the present invention to be read together with the accompanying drawings, the description of the drawings being provided solely for purposes of illustration.

FIG. 3 is a vertical cross-sectional view taken along line 3—3 of FIG. 2.

FIG. 4 is a partial horizontal sectional view taken along line 4—4 of FIG. 2.

FIG. 5 is a partial elevational view taken along line 5—5 of FIG. 4 but showing a modification of the present invention.

FIG. 6 is a vertical sectional view taken along line 6—6 of FIG. 5 and showing in addition a single tooth element cooperating therewith.

FIG. 7 is a partial elevational view similar to FIG. 5 and showing another modification of the present invention.

FIG. 8 is a vertical sectional view taken along line 8—8 of FIG. 7 and showing a tooth element.

FIG. 9 is a partial elevational view similar to FIGS. 5 and 7 and showing still another modification of the present invention.

FIG. 10 is a vertical sectional view taken along line 10—10 of FIG. 9 and including a tooth element.

FIG. 11 is a side elevational view showing a modified bristle structure.

FIG. 12 is an end view of FIG. 11.

DETAILED DESCRIPTION OF THE PREFERRED EMBODIMENT

Figure 1:
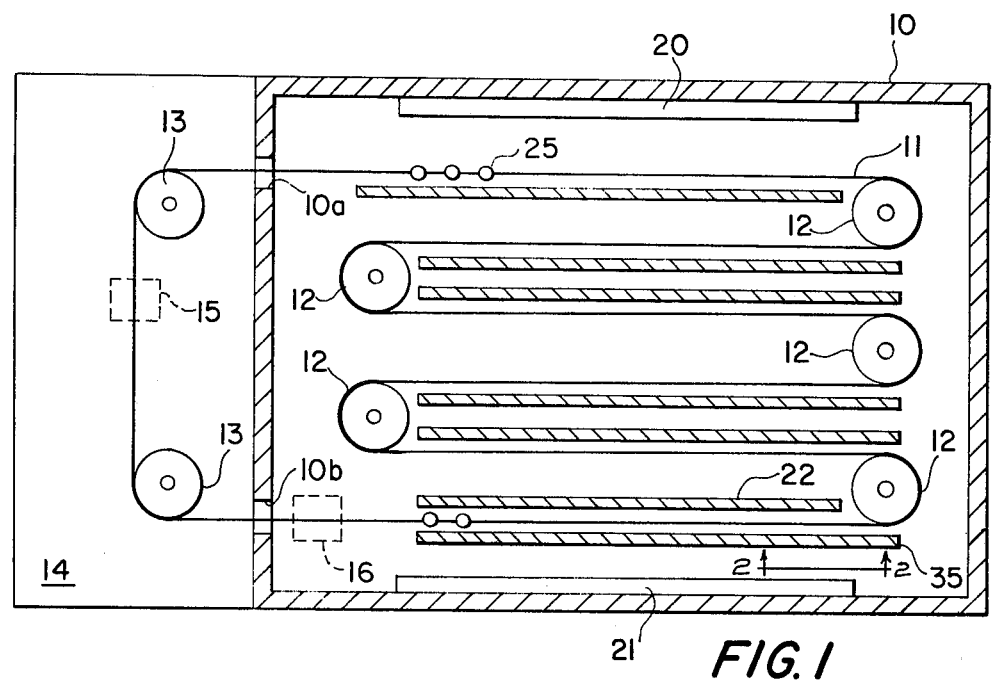
FIG. 1 is a schematic view of a parison heating oven of the type with which the present invention is concerned.

Referring now to the drawings, like elements are represented by like numerals throughout the several views.

FIG. 1 illustrates schematically a parison heating oven comprising a housing 10 and a transport means in the form of an endless conveyor 11 which may be of a chain construction and which is mounted for rotation about sprocket wheels 12 and 13, the wheels 12 being located in the oven and the sprocket wheels 13 being located on a platform 14 outside of the oven housing 10. Any one of these sprocket wheels may conveniently be operatively connected to a drive means, not shown, for effecting movement of the conveyor 11. The oven includes a parison loading station indicated diagrammatically at 15 whereat parisons would be loaded onto the conveyor and a parison discharge station indicated diagrammatically at 16 whereat heated parisons would be removed off of the conveyor, for example by a transfer means, and transferred to a blow mold which may for example be located on the platform 14. There are numerous forms of parison loading means and transfer means for removing the heated parisons which are known heretofore so that these elements are not shown in detail herein. Examples of suitable means are shown in the said commonly owned U.S. Pat. No. 3,765,813.

The oven includes a hot air inlet plenum 20 through which air at a sufficiently high temperature enters the oven to flow thereacross to an exhaust air plenum 21. As mentioned earlier, the U.S. Pat. No. 3,801,263 illustrates and describes in detail the cross flow arrangement indicated diagrammatically herein. That patent also suggests the concept of heating the parisons nonuniformally along their axial lengths, i.e., in the vertical direction, and for this purpose the oven may include a bank of electric strip heaters 22 which may for example comprise a plurality of horizontally extending and vertically spaced apart heaters, each of the heaters being separately controllable. It is always important to heat the parisons uniformly about their circumferences and this is perhaps of even greater importance when utilizing a strip heater such as 22 for varying the heat applied along the length of the parison so as to program intentional axial non-uniformity. Also shown in FIG. 1 are a few parison holders 25. It will be understood, however, that these parison holders are actually located continuously along the entire length of the conveyor 11. These will be described in greater detail with respect to subsequent figures.

An important feature of the present invention is of course the tooth engaging means positioned alongside the conveyor for causing rotation of the parison holders 25. Support strips 35 for the tooth engaging means are illustrated in FIG. 1 extending along only each run of conveyor 11 within the oven housing 10. It will be understood, however, that this tooth engaging means may be necessary only for selected portions instead of along every run. In fact, it is one advantage of the present invention that the tooth engaging means may be limited to the straight part of the runs. Heretofore, the problem of reengaging the sprocket wheels with the chain or other tooth engaging means was so great that the tooth engaging means had to extend right around the sprocket 12 so as to prevent disengagement. Since, with the present invention, reengagement with the tooth engaging means is so positive and simple, there is no longer a need to extend the tooth engaging means around the sprockets 12.

Figure 2:
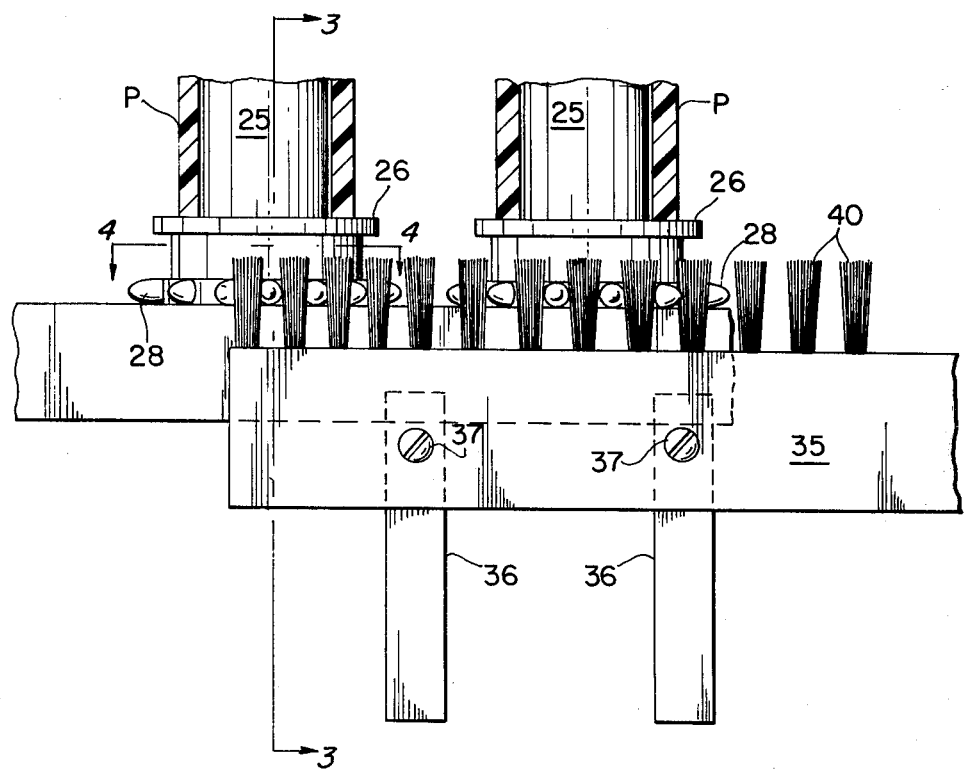
FIG. 2 is an enlarged elevational view, taken along line 2—2 of FIG. 1, with the parisons shown in cross-section so as to reveal the parison holders therein.

Referring now to FIGS. 2 through 4, the parison holders 25 include a pin portion 25a extending up into the parison P and a shoulder 26 for receiving the lower end of the parison. The holder 25 further includes a toothed wheel 27 having teeth 28 extending outwardly therefrom. Preferably, the carrier 25 includes a hollow recess and a set of spring biased balls 29 so that it may be snapped onto a rod 30 which extends upwardly from the conveyor 11 to which it is fixed at its lower end.

The means for engaging the teeth 28 for turning the parison holders 25 about their axes comprises a group of bristles 40 firmly secured at their lower ends to a horizontally extending strip 35 which is attached to horizontally spaced apart vertical post 36 by suitable means such as bolts 37. In the embodiment of FIGS. 2 through 4 the brush-like stiff bristles are arranged as separate tufts and are spaced apart along the support strip 35 by a distance related to the pitch of the teeth 28 so that ideally the individual teeth will mesh between the individual tufts. If the tooth wheel 27 becomes misaligned with respect to the tufts 40, as opposed to the ideal meshing arrangement shown in the figures, the individual bristles of the tuft being pushed by the misaligned tooth will simply yield, allowing the tooth to move between the bristles so that damage will be caused to neither the bristles of the tuft 40 nor the tooth 28. Eventually and most likely in less than one revolution of the element 25, the teeth 28 will once again resume proper meshing engagement with the tufts 40. Although the problem of misalignment could occur for a number of reasons at any location throughout the length of the conveyor, it will be seen that the problem is particularly critical where the conveyor first engages or re-engages a strip 35. At these locations it might be desirable to utilize bristles having a stiffness slightly less than for portions farther along a continuous length of the strip 35. Or alternatively, one might even use a prior art chain type tooth engaging means downstream from the bristles along a given run.

FIGS. 5 and 6 illustrate another embodiment of the invention wherein the individual tufts 40 are replaced by a continuous stand of bristles 140 mounted on a suitable strip 135. Actually, these bristles 140 may or may not be in the form of tufts, but if they are formed as tufts, the tufts are so close together that they function as a continuous stand of bristles, i.e., there is not the spacing between the tufts related to the pitch of the teeth as in the embodiment of FIGS. 2 through 4. In this case the teeth will simply push into the mass of bristles 140 and roll therealong, the bristles of course being sufficiently yielding to permit entry of the teeth 28 thereinto but yet sufficiently stiff to react against the teeth to cause the necessary rotation thereof.

The embodiment of FIGS. 7 and 8 is similar to the embodiment of FIGS. 2 through 4 except that the strip 35 is replaced by a strip 235 supporting tufts 240 which extend horizontally toward the conveyor rather than vertically. In this case the tufts would also be spaced apart in relation to the pitch of the teeth 28. In this case because the teeth engage parallel to the direction of the bristles rather than across the bristles as in FIGS. 2 through 4, the tufts 240 must of course be somewhat stiffer than the tufts 40.

The embodiment of FIGS. 9 and 10 combines the features of the embodiments of FIGS. 5 and 7 in that it essentially provides a horizontally extending continuous stand of wire bristles wherein the teeth 28 engage into the ends of the bristles. FIGS. 11 and 12 illustrate still another type of brush which could be mounted on strip 35 to act as a tooth engaging means. These figures show a twisted wire type brush similar to the type used to clean bottles wherein the bristles are held by a twisted wire support comprising a pair of wires twisted together so as to hold between them a large number of bristles extending in all directions as shown best in FIG. 12.

In all respects other than those specifically described, the embodiments of FIGS. 5 through 12 are identical to the embodiment of FIGS. 2 through 4 and relate in the same manner to the oven shown and described with respect to FIG. 1.

Although the operation of the invention will be apparent from the preceding discussion, a brief summary of the operation will follow for purposes of continuity.

Parisons are loaded onto the conveyor 11 at the loading station 15. The parisons then enter the housing 10 at opening 10a and are carried along the conveyor path back and forth through the oven, all the while being heated by air flowing from inlet plenum 20 to exhaust plenum 21, the parison holders 25 turning about their axes for uniform heating thereof about their circumferences wherever the parisons 25 engage a tooth engaging means mounted on a strip support 35. If programmed non-uniform heat application along the vertical, i.e., axial length of the parison is desired, this is normally accomplished at the latter end of the conveyor path through the oven such as by the strip heater bank 22 located alongside the last two runs of the conveyor. After the parisons have been properly heated they reach the parison discharge station 16 whereat they are removed from the oven for transfer to the blow mold (not shown). The conveyor 11 then passes out through the opening 10b and around a sprocket 13 and back to the loading station to receive a new parison.

For maximum stiffness, the bristles would preferably be stainless steel wires. However any other bristles would be operable such as plastic bristles, provided that they were of a material which would not become soft at the temperatures which prevail in the oven.

Although the invention has been described in considerable detail with respect to preferred embodiments thereof, it will be apparent that the invention is capable of numerous modifications and variations apparent to those skilled in the art without departing from the spirit and scope of the invention.

I claim:
1. An oven for heating tubular parisons comprising:
an oven housing,
means for heating the interior of the oven housing,
a transport means for transporting the parisons along a path through the oven housing,
turning means for turning the tubular parisons about their axes as they travel through the oven housing, said turning means comprising a toothed rotatable member operatively associated with each parison such that its respective parison rotates therewith,
and a group of stiff bristles positioned alongside at least a portion of the said path through the oven housing close enough to the path to be engaged by the teeth of said toothed rotatable member for causing rotation of the toothed rotatable member and hence rotation of the parisons about their axes.

2. An oven according to claim 1, said group of stiff bristles arranged in tufts, the individual tufts spaced apart alongside the path by a distance related to the pitch of the teeth on the toothed rotatable member.

3. An oven according to claim 2, said tufts extending vertically and positioned at a distance from the path such that the teeth of the tooth rotatable member can enter the spaces between the tufts.

4. An oven according to claim 2, said tufts extending horizontally toward the path and positioned a distance from the path such that the teeth of the toothed rotatable member pass between the bristles of the tufts.

5. An oven according to claim 1, said group of stiff bristles comprising an essentailly continuous stand of bristles positioned such that the teeth of the tooth rotatable member can enter the stand between the bristles thereof and react thereagainst to turn the tooth rotatable member.

6. An oven according to claim 5, the stiff bristles extending vertically.

7. An oven according to claim 5, the stiff bristles extending horizontally toward the path.

8. An oven according to claim 1, said transport means comprising a conveyor, parison holders mounted on the conveyor to support parisons in an upright position to rotate about their respective vertical axes, each parison holder having a said rotatable member affixed thereto for rotation therewith.

9. An oven according to claim 8, said group of stiff bristles arranged in tufts, the individual tufts spaced apart alongside the path by a distance related to the path of the teeth on the toothed rotatable member.

10. An oven according to claim 9, said tufts extending vertically and positioned at a distance from the path such that the teeth of the toothed rotatable member can enter the spaces between the tufts.

11. An oven according to claim 8, said group of stiff bristles comprising an essentially continuous stand of wires positioned such that the teeth of the tooth rotatable member can enter the stand between the bristles thereof and react thereagainst to turn the toothed rotatable member.

12. An oven according to claim 8, including means in the oven alongside at least a portion of said path for varying the temperature of the heat as applied to different heights of the parison.

13. An oven according to claim 1, said group of bristles comprising a continuous row of bristles held in a twisted wire support.

14. An oven according to claim 1, said means for heating the interior of the housing comprising means for directing a current of heated air across the oven, said transport means comprising a conveyor movable through the oven across said current of heated air, and including parison holders mounted on the conveyor for rotation about a vertical axis and for supporting the parisons for rotation about vertical axes as they pass through the oven, a said toothed rotatable member fixed to each parison holder for rotation therewith.

15. An oven according to claim 14, said group of stiff bristles arranged in tufts, the individual tufts spaced apart alongside the path by a distance related to the pitch of the teeth on the toothed rotatable member.

16. An oven according to claim 15, said tufts extending vertically and positioned at a distance from the path such that the teeth of the toothed rotatable member can enter the spaces between the tufts.

17. An oven according to claim 14, said group of stiff bristles comprising an essentially continuous stand of bristles positioned such that the teeth of the toothed rotatable member can enter the stand between the bristles thereof and react thereagainst to turn the toothed rotatable member.

* * * * *